United States Patent
Hagelauer

[11] Patent Number: 6,148,259
[45] Date of Patent: Nov. 14, 2000

[54] PROCESS AND DEVICE FOR DETERMINING AN OPTIMAL FLIGHT PATH OF AN AIRCRAFT

[75] Inventor: Patrick Hagelauer, Toulouse, France

[73] Assignee: Aerospatiale Societe Nationale Industrielle, Paris, France

[21] Appl. No.: 09/034,785

[22] Filed: Mar. 4, 1998

[30] Foreign Application Priority Data

Mar. 18, 1997 [FR] France .................................. 97 03246

[51] Int. Cl.⁷ .............................. G06F 19/00; G05D 1/04; B64D 43/00
[52] U.S. Cl. ........................... 701/122; 701/123; 701/201
[58] Field of Search .................................... 701/122, 123, 701/201, 202

[56] References Cited

U.S. PATENT DOCUMENTS

| | | | |
|---|---|---|---|
| 3,974,481 | 8/1976 | Ledieu et al. .............................. | 700/33 |
| 4,706,198 | 11/1987 | Thurman ................................... | 701/120 |
| 4,760,530 | 7/1988 | Liden ....................................... | 701/123 |
| 4,812,990 | 3/1989 | Adams et al. .............................. | 701/3 |
| 5,574,647 | 11/1996 | Liden ......................................... | 701/8 |
| 5,752,217 | 5/1998 | Ishizaki et al. ......................... | 701/201 |

FOREIGN PATENT DOCUMENTS 2230260  12/1974  France .

OTHER PUBLICATIONS

Liden, S. "Optimum Cruise Profiles In The Presence Of Winds", 1992, IEEE, pp. 254–261.
Liden, S. "The Evolution Of Flight Management Systems", IEEE, pp. 157–169.
French Search Report dated Nov. 20, 1997, 3 pages.

Primary Examiner—Michael J. Zanelli
Assistant Examiner—Eric M. Gibson
Attorney, Agent, or Firm—Marshall, O'Toole, Gerstein, Murray & Borun

[57] ABSTRACT

A method of determining an optimal flight path of an aircraft during its cruising phase includes forming a grid in a vertical plane of the space between a first position and a second position, selecting various path portions between the first position and the second position, determining the cost of each of the path portions, determining various possible paths from the path portions, determining the cost of each of the possible paths, and selecting the lowest-cost path.

12 Claims, 3 Drawing Sheets

PROCESS AND DEVICE FOR DETERMINING AN OPTIMAL FLIGHT PATH OF AN AIRCRAFT

BACKGROUND OF THE INVENTION

The present invention relates to a process and device for determining an optimal flight path of an aircraft.

Although not exclusively, the present invention applies more particularly to an aircraft, in particular a civil transport airplane, fitted with a flight management computer.

It is known that, generally, one of the main objectives of such a flight management computer is to optimize the cost of the flight.

It will be noted that within the context of the present invention, said cost is defined on the basis of a flight criterion specified below which takes into account for example the fuel consumed and/or the duration of the flight. This optimization of the flight can of course relate to all the phases of the flight, for example takeoff, climb, cruising flight, descent, landing, etc. However, since out of all the possible phases of flight, the phase of cruising flight (or cruising phase) is generally the longest, the most significant savings liable to be made relate to this latter phase. It is for this reason that the present invention is concerned exclusively with said cruising phase.

DESCRIPTION OF THE PRIOR ART

In a known manner, since the cruising flight is generally restricted to flying at flight levels at altitudes specified by the authorities managing the air traffic, the optimization implemented by the flight management computer generally consists in determining the optimal positions of the points of change of flight level, such as described for example in an article by Sam Liden entitled "The Evolution of Flight Management Systems" published on the occasion of the conference "Digital Avionics Systems Conference" of 1994.

Various solutions are known for carrying out such optimization.

However, none of the usual known solutions carry out the optimization according to a global picture, but as the successive solving of partial optimization problems restricted on each occasion to searching for a single position of change between two specified flight levels, for example the current flight level and the higher flight level.

Additionally, when several changes of level are envisaged, the search for a position of change is implemented only when the previous position of change is determined.

Consequently, the positions of change of level obtained by these known solutions, often do not correspond to those which enable the global flight cost to be minimized throughout the cruising phase, since a change of level which is judicious over a limited flight region, such as dealt with by said known solutions, may prove to be prejudicial over a larger flight region, for example by making it necessary to effect other changes of level which would not have been necessary if the first change of level had not been effected.

By way of example, an article by Sam Linden, entitled "Optimum Cruise Profiles in the Presence of Winds" published on the occasion of the conference "11th Digital Avionics Systems Conference" of October 1992 in Seattle, describes such a solution. In this case, the search for all the points of change of level is made in a single processing operation.

However, only two successive defined flight levels are taken into account on each occasion. Additionally, although determined through a single processing operation, the various points of change of level are in this example likewise optimized in a successive and independent manner.

SUMMARY OF THE INVENTION

The object of the present invention is to overcome these drawbacks. It relates to a process for determining a globally optimal flight path of an aircraft between a first position and a second position, said flight path consisting of adjacent straight path portions.

To this end, according to the invention, said process is noteworthy in that:

I/ a grid of the space between said first and second positions is formed, said grid:
  corresponding to the division, in a vertical plane, of the space between said first and second positions, into N successive steps, namely steps 1, 2, ..., k, ..., N, N being a specified interger and k being any interger lying between 1 and N, the first position representing a step O and the second position being situated at step N, each of said N steps k being defined by a vertical line of said vertical plane;
  defining for each of said N steps, various positions situated at various altitudes along the corresponding vertical line; and
  associating with each of said N steps k, path portions permitted for flight by the aircraft, between the positions defined for step k-1 and the positions defined for said step k; and II/ the following string of phases of operations, relating to a step k, is repeated for each of steps 1 to N:
  a) the path portions liable to be followed by said aircraft are selected, from all the path portions associated with step k and defined in said grid, on the basis of specific characteristics of the aircraft;
  b) the cost of each of said selected path portions is evaluated, said cost corresponding to the value of a cost criterion, generated by said aircraft when it traverses the corresponding path portion;
  c) on the one hand, on the basis of the paths retained in the string of phases of operations, relating to step k-1, in order to join up with the various positions respectively of step k-1 starting from the first position and, on the other hand, on the basis of the path portions selected in the present phase of operations a), the various possible paths for joining up with the various positions of step k starting from the first position are determined;
  d) the cost of each of said possible paths determined in the phase of operations c) is computed, on the basis of the cost of the paths retained in the string of phases of operations, relating to step k-1, and of the cost evaluated in the phase of operation b) of the corresponding path portions; and
  e) for each of the positions of step k, the costs computed in the phase of operations d) of the various paths arriving at said position are compared with one another and the path exhibiting the lowest cost is retained, the path retained for step N and arriving at said second position corresponding to said sought-after optimal flight path.

Thus, by virtue of the invention, the flight path is optimized in a global manner, by taking into account all the possible flight levels between said first and second positions.

Of course, the aforementioned process can be implemented in order to determine the optimal positions of the points of change of flight level between said first and second positions.

In this case, according to the invention, said optimal positions correspond to the positions of said flight path, which are defined in steps 1 to N-1, and for which the path portion which follows exhibits a non-zero slope.

Generally, the process according to the invention is used to determine an optimal flight path between a first specified position and a second position situated on the vertical line of step N.

Under this assumption, advantageously, in the phase of operations e), the costs of the paths retained for the various positions of step N are compared with one another and the path exhibiting the lowest cost is retained as optimal path, the path thus retained defining the second position along the corresponding vertical line.

Of course, within the context of the present invention, said process can also be implemented in order to determine the optimal path between first and second positions which are initially known.

When the cost of the path portions is independent of the current state of the aircraft, the process can be implemented, as is usually the case for "dynamic programming" methods of the type used in said process, commencing at the terminal position, in which the state of the aircraft is not known a priori. The first position described in said process then corresponds to the terminal position and the second position corresponds to the initial position of said path.

However, in practice, the cost of the path portions depends on the current state of the aircraft. Thus, according to the invention, said first position represents the initial position in which the state of the aircraft is known, and said second position, the terminal position. Such an implementation, which therefore goes against the usual practice, makes it possible, on the one hand, to take into account the known initial state of the aircraft in order to perform an accurate computation of the cost of the path portions and, on the other hand, to ensure easy incorporation into the computational systems which generally exist on the aircraft and which operate from the initial position to the terminal position.

An implementation in accordance with usual practice would generally be possible but, in practice, delivers less satisfactory results.

Furthermore, when the aircraft is provided with a preset flight plan, advantageously, for each of said steps, the altitudes of the positions along the corresponding vertical line are extracted from said flight plan.

Moreover, advantageously, to form said grid, operational constraints are taken into account which prohibit or prescribe certain path portions for the flight of the aircraft.

Additionally, preferably, the specific characteristics of the aircraft which are taken into account in the phase of operations a), are determined from the flight envelope of said aircraft.

Furthermore, in the phase of operations b), the costs are evaluated by implementing a prediction procedure, of the known type, generally incorporated into the flight management computer of the aircraft.

Preferably:
for the implementation of said prediction procedure, specific characteristics of the aircraft are used, together with meteorological information; and
said cost criterion takes into account the estimated fuel consumption and estimated durtion for traversing the corresponding path portion.

The present invention also relates to a device for implementing the aforementioned process.

According to the invention, said device which is preferably incorporated as appropriate into the flight management computer of the aircraft, comprises:

means for forming a grid of the space;

means for selecting path portions on the basis of specific characteristics of the aircraft;

means for evaluating the cost of the selected path portions;

means for determining possible paths and for computing their costs;

means for comparing said costs, for retaining the paths exhibiting the lowest cost and for determining said sought-after optimal path; as well as means for determining the optimal positions of the points of change of flight level between said first and second positions.

BRIEF DESCRIPTION OF THE DRAWINGS

The figures of the appended drawing will elucidate the manner in which the invention may be practiced. In these figures, identical references denote similar elements.

DESCRIPTION OF THE PREFERRED EMBODIMENTS

Figure 1:
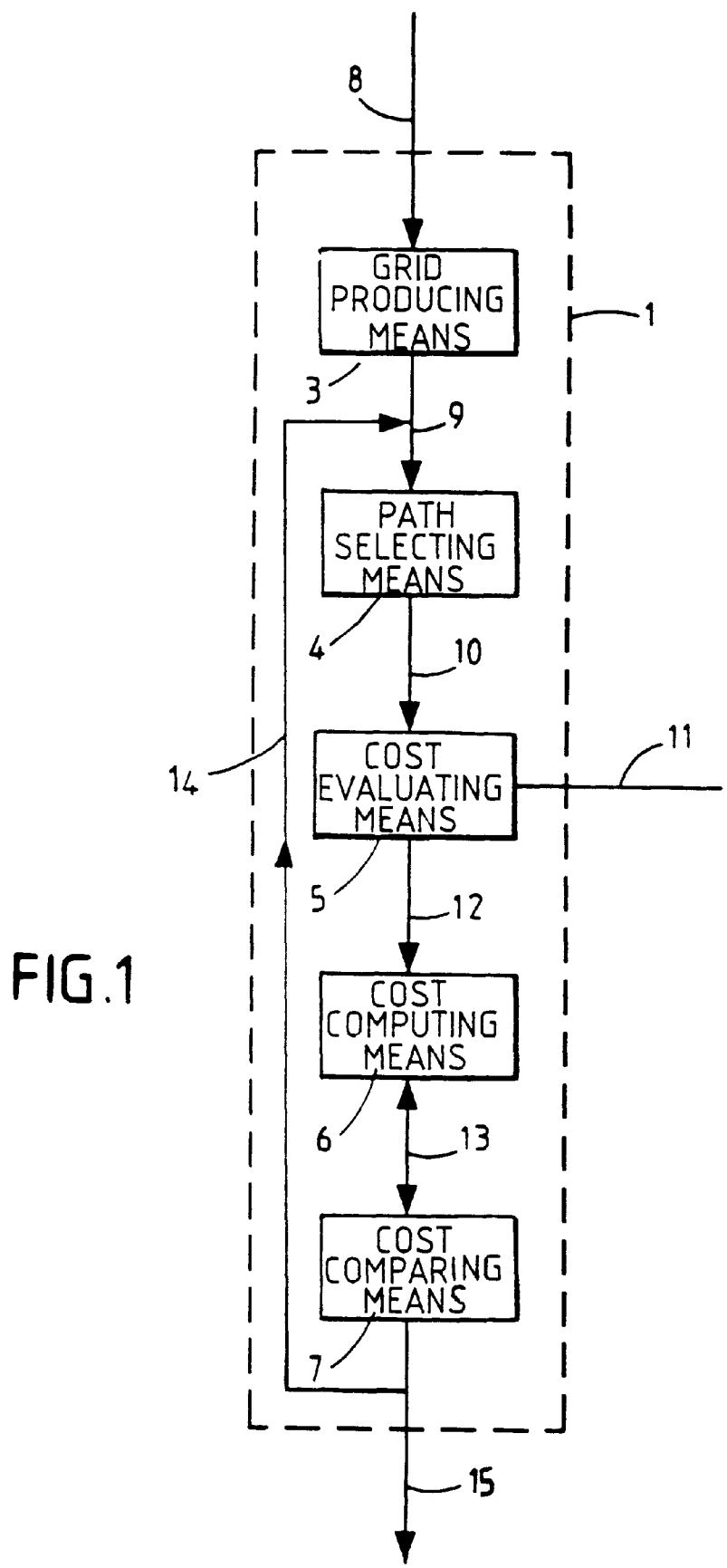
FIG. 1 is a diagram of a device in accordance with the invention.
Figure 2:
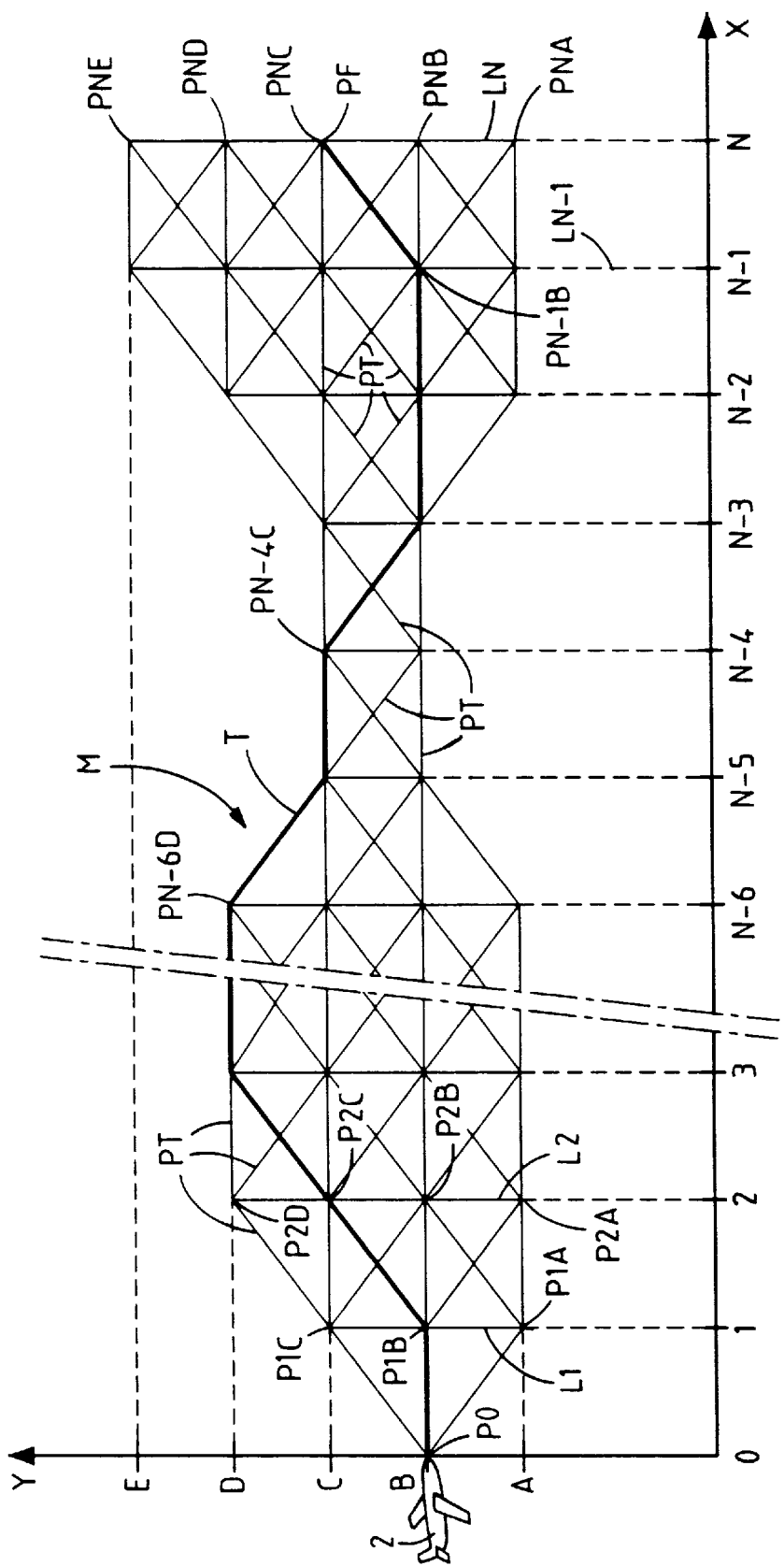
FIG. 2 illustrates the construction of a grid in accordance with the invention in a vertical plane comprising initial and terminal positions of the flight of an aircraft in the cruising phase.

The device 1 in accordance with the invention and represented diagrammatically in FIG. 1 is intended to determine an optimal flight path T of an aircraft 2 between a first position PO and a second position PF of the cruising phase of said aircraft 2, such as represented in FIG. 2, as well as optimal positions of the points of change of flight level.

Within the context of the present invention, the optimization of a flight path relates to reducing the flight cost, as specified below, and the flight path is formed, in a known manner, of adjacent straight path portions PT.

To this end, said device 1 which is for example incorporated, as appropriate, into a flight management computer of the aircraft 2, comprises according to the invention:

means 3 capable of producing a grid M of the space between said positions PO and PF, as specified below; and means 4 to 7 which carry out repetitive processing operations using said grid M in such a way as to deduce therefrom said optimal path T, as well as the optimal positions of the points of change of flight level which result therefrom.

According to the invention, said grid M represented in FIG. 2:

corresponds to the division, in a vertical plane OXY (OX representing the horizontal and OY the vertical), of the space between said positions PO and PF, into N successive steps, N being an interger assumed to be greater that 10 in the example represented in FIG. 2, said position PF being situated at step N, each of said N steps being defined by a vertical line L1 to LN of said vertical plane OXY;

defines for each of said N steps, various positions, for example the positions P2A, P2B, P2C and P2D for step 2, situated at various altitudes A, B, C, D and E along the corresponding vertical line; and associates with each of said N steps k, k being any interger lying between 1 and N, path portions PT permitted for flight by the aircraft 2, between the positions defined for step k-1 and the positions defined for said step k.

In order to form said grid M, said means 3 receive information by way of a link 8, and especially the flight plan relating to the cruising phase of the aircraft 2.

It will be noted that in particular, the altitudes A, B, C, D and E corresponding to the altitudes of horizontal flight levels, on which the aircraft 2 is permitted to fly, are extracted from said flight plan.

However, in a particular embodiment, these altitudes can also be determined directly by the means 3, for example by means of a computation by increments.

To form said grid M, the means 3 also take into account operational constraints which are in particular liable to prohibit or prescribe certain path portions for the flight of the aircraft 2. Thus, by way of example, between step N-5 and step N-3, the flight levels situated at the altitudes A, D and E are prohibited and only the flight levels situated at the altitudes B and C are permitted.

The case in which a second position is prescribed must be regarded as being a particular case of the case indicated previously.

The processing operations carried out by the means 4 to 7 and specified below are performed repetitively for each of the N steps of the grid M.

These processing operations will now be explained for any step k illustrated in FIG. 3.

The means 4 which receive the grid M from the means 3 by way of a link 9 select, from all the path portions PT1 to PT10 associated with step k and defined in said grid M, the allowable path portions PT1, PT2, PT4, PT5, PT7, PT8 and PT10 capable of being followed by said aircraft 2, on the basis of specific characteristics of the latter. The specific characteristics taken into account in this case are determined from the flight envelope of said aircraft 2 and therefore depend on the assumed state of the aircraft 2 in step k-1.

In this case it is also possible to eliminate certain types of path portions, for example those exhibiting a decreasing slope, as envisaged for the path portions PT3, PT6 and PT9 represented by broken lines.

The path portions PT1, PT2, PT4, PT5, PT7, PT8 and PT10 thus selected by the means 4 are transmitted via a link 10 to the means 5.

The latter then evaluate the cost of each of said selected path portions PT1, PT2, PT4, PT5, PT7, PT8 and PT10. Within the framework of the present invention, for any path portion, said cost corresponds to the value of a cost criterion, as generated by said aircraft 2 when it traverses said path portion.

Preferably, said cost criterion takes into account the estimated fuel consumption and/or estimated duration for traversing the corresponding path portion.

To determine the cost of each of said selected path portions, said means 5 implement a known standard prediction procedure, using for this purpose specific characteristics of the aircraft 2 in step k-1, together with meteorological information received from a device (not represented) by way of a link 11.

The costs thus evaluated are transmitted to the means 6 by way of a link 12.

These means then determine:

on the one hand, on the basis of the paths Tk-1A, Tk-1B, Tk-1C and Tk-1D represented partially and retained in the processing operations relating to step k-1, in order to join up with the various positions Pk-1A, Pk-1B, Pk-1C and Pk-1D respectively of step k-1 starting from the position PO, the paths retained being received by a dual link 13 of the means 7; and on the other hand, on the basis of the path portions PT1, PT2, PT4, PT5, PT7, PT8 and PT10 selected by the means 5 for step k and received by the link 12, the various possible paths for joining up with the various positions PkA, PkB, PkC and PkD of step k starting from the position PO.

Next, said means 6 compute the cost of the various paths thus determined, on the bases:

on the one hand, of the cost of said paths Tk-1A, Tk-1B, Tk-1C and Tk-1D retained in the processing operations relating to step k-1, recorded in the means 7 and received by way of the dual link 13; and on the other hand, of the cost evaluated by the means 6 of the path portions PT1, PT2, PT4, PT5, PT7, PT8 and PT10.

The costs thus computed by the means 6 are then transmitted to the means 7 by the link 13.

These latter means then compare, in succession for each of the positions PkA, PkB, PkC and PkD of step k, the costs computed by the means 6 of the various paths arriving at said position and they retain and record, for each of said positions of step k, the path exhibiting the lowest cost, together with the corresponding cost.

By way of example, it will be noted that in order to arrive at the position PkB, two paths are possible, namely a first path formed by Tk-1B and PT4 and a second path formed by Tk-1A and PT2.

In the case in which said second path exhibits the lowest cost, the means 7 retain this path only.

Figure 3:
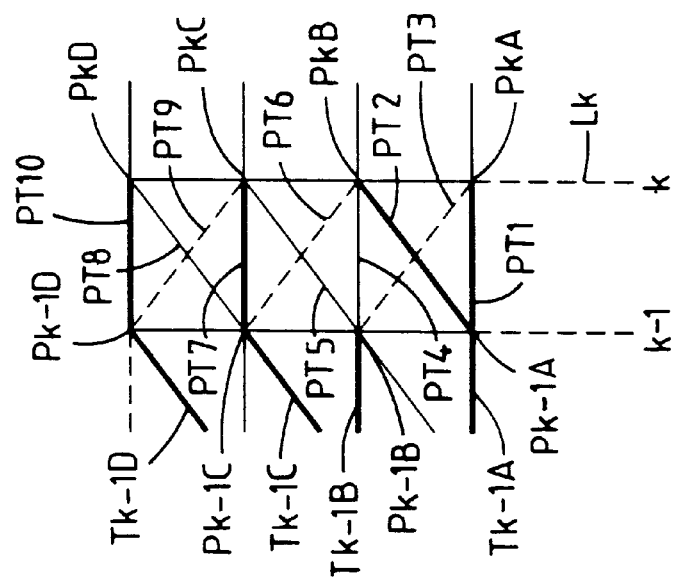
FIG. 3 illustrates a section of grid, showing any two successive steps of said grid.

In FIG. 3 the various paths retained for each of the positions PkA, PkB, PkC and PkD of step k have been represented by an emboldened continuous line.

The processing operations specified above and carried out by the means 4 to 7 are performed in succession for each of said steps 1 to N, as illustrated by a link 14 in FIG. 1.

Figure 4:
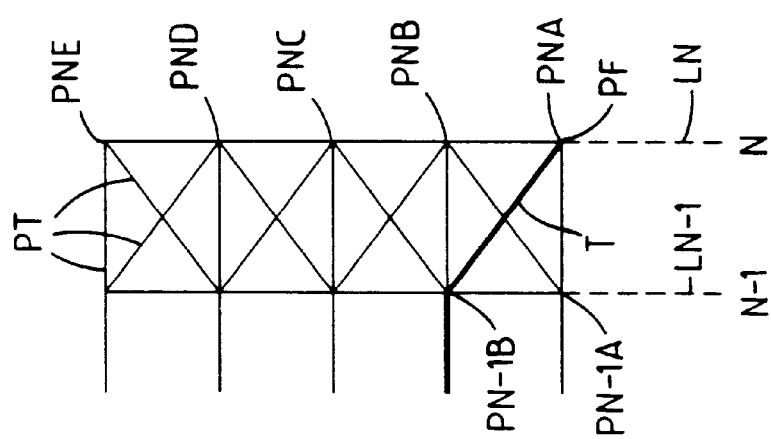
FIG. 4 shows the last two steps of the grid, illustrating a first implementation of the process in accordance with the invention.

However, as regards step N, two different embodiments are possible, illustrated in FIGS. 4 and respectively.

In a general case, the position PF is not fixed, but corresponds to one of the possible positions PNA, PNB, PNC, PND and PNE on the vertical line LN of step N. In this case, the means 7 determine the path exhibiting the lowest cost, this path then defining the terminal position PF which corresponds to the position PNA in the example represented in FIG. 4.

Figure 5:
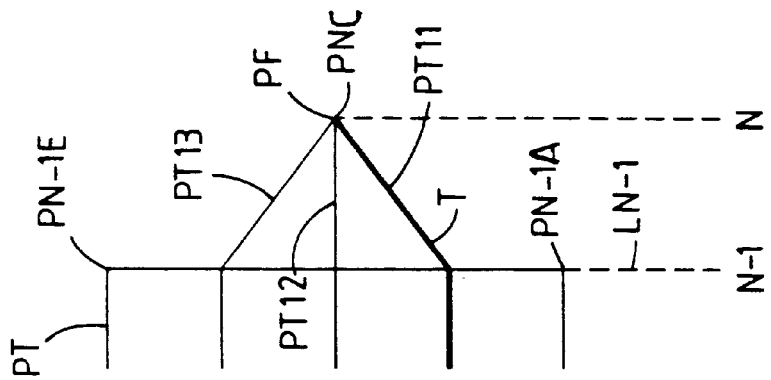
FIG. 5 shows the last two steps of the grid, illustrating a second implementation of the process in accordance with the invention.

In the particular case in which the position PF is fixed before implementing the processing operations and corresponds to the position PNC in FIG. 5, the means 7 determine in step N only the least expensive path arriving at said position PNC, that is to say they ignore the path portions PT11, PT12 and PT13.

By means of these processing operations, it is thus made possible to determine an optimal path T represented by an emboldened continuous line in FIG. 2.

On the basis of the path T thus determined, the means 7 define the optimal positions of the points of change of level for the flight of the aircraft 2 from the position PO to the position PF and they transmit them by way of a link 15 to a user device (not represented). These optimal positions correspond to the positions, of the path T, on the basis of which changes of level are effected, namely the positions P1B, P2C, PN-6D, PN-4C and PN-1B of FIG. 2.

Thus, by virtue of the invention, the flight path T and the positions of the points of change of flight level are globally optimized, while taking into account the specific characteristics of the aircraft 2, together with the meteorological conditions, thus making it possible considerably to reduce the cost of the flight between the initial position PO and the terminal position PF.

What is claimed is:

1. A process for determining an optimal flight path (T) of an aircraft (2) during the cruising phase of said aircraft (2) from a first vertical position corresponding to an initial position (PO) at cruising altitude to a second vertical position corresponding to a terminal position (PF) at cruising altitude, said flight path (T) consisting of adjacent straight vertical path portions (PT), said method comprising:

forming a grid (M) of the space between said first and second positions (PO, PF), said grid (M) corresponding to the division, in a vertical plane (OXY), of the space between said first and second positions (PO, PF) at cruising altitude, into N successive steps, namely steps 1, 2, ..., k, ..., N, N being a specified integer and k being any integer lying between 1 and N, each of said successive steps 1 to N being successively performed in order from said first position to said second position, the first position (PO) representing a step O and the second position being situated at step N, each of said N steps k being defined by a vertical line (L1 to LN) of said vertical plane (OXY), defining for each of said N steps, various positions (PkA, PkB, PkC, PkD) situated at various altitudes (A, B, C,) along the corresponding vertical line (Lk), and associating with each of said N steps k, path portions (PT1 to PT10) permitted for flight by the aircraft (2), between the positions (Pk-1A, Pk-1B, Pk-1C, Pk-1D) defined for step k−1 and the positions (PkA, PkB, PkC, PkD) defined for said step k; and repeating the following operations, relating to a step k, for each of steps 1 to N:

a) selecting the path portions (PT1, PT2, PT4, PT5, PT7, PT8, PT10) liable to be followed by said aircraft (2) from all the path portions (PT1 to PT10) associated with step k and defined in said grid (M), on the basis of specific characteristics of the aircraft;

b) evaluating the cost of each of said selected path portions, said cost corresponding to the value of a cost criterion relating to the traversal of said aircraft (2) of each path portion;

c) determining various possible paths for joining up with various positions (PkA, PkB, PkC, PkD) of step k starting from the first position (PO) on the basis of the paths (Tk-1A, Tk-1B, Tk-1C, Tk-1D) retained in a previous performance of operation f) relating to step k−1 and on the basis of the path portions selected in the present performance of operation a) relating to k;

d) computing the cost of each of said possible paths determined in the present performance of operation c) relating to k on the basis of the cost of the paths retained during a previous performance of operation f) relating to step k−1, and of the cost evaluated in the present performance of operation b) relating to k;

e) comparing, for each of the positions of step k, the costs computed in the present performance of operation d) relating to k of the paths arriving at said position with one another; and f) retaining the path exhibiting the lowest cost, the path (T) retained for step N and arriving at said second position (PF) corresponding to said sought-after optimal flight path.

2. The process as claimed in claim 1, for determining an optimal flight path between a first specified position (PO) and a second position (PF) situated on the vertical line (LN) of step N, wherein the costs of the paths retained are compared with one another and the path exhibiting the lowest cost is retained as optimal path, the path thus retained defining the second position (PF) along the corresponding vertical line.

3. The process as claimed in claim 1, for determining the optimal positions of the points of change of flight level between said first and second positions (PO, PF), wherein said optimal positions correspond to the positions (P1B, P2C, PN-6D, PN-4C, PN-1B) of said flight path (T), which are defined in steps 1 to N−1, and for which the path portion (PT) which follows exhibits a non-zero slope.

4. The process as claimed in claim 1, for an aircraft (2) provided with a preset flight plan, wherein, for each of said steps, the altitudes of the positions (PkA, PkB, PkC, PkD) along the corresponding vertical line (Lk) are extracted from said flight plan.

5. The process as claimed in claim 1, wherein, to form said grid (M), operational constraints are taken into account which prohibit or prescribe certain path portions (PT) for the flight of the aircraft (2).

6. The process as claimed in claim 1, wherein the specific characteristics of the aircraft (2) which are taken into account in operation a) are determined from the flight envelope of said aircraft (2).

7. The process as claimed in claim 1, wherein in operation b), the costs are evaluated by implementing a prediction procedure.

8. The process as claimed in claim 7, wherein for the implementation of said prediction procedure, specific characteristics of the aircraft are used, together with meteorological information.

9. The process as claimed in claim 1, wherein said cost criterion takes into account the estimated fuel consumption of the aircraft (2) when traversing the corresponding path portion (PT).

10. The process as claimed in claim 1, wherein said cost criterion takes into account the estimated duration for the aircraft (2) to traverse the corresponding path portion (PT).

11. A device for implementing the process specified under claim 1, said device comprising:

means (3) for forming a grid of the space;

means (4) for selecting path portions on the basis of specific characteristics of the aircraft (2);

means (5) for evaluating the cost of the selected path portions;

means (6) for determining possible paths and for computing their costs; and means (7) for comparing said costs, for retaining the paths exhibiting the lowest cost and for determining said sought-after optimal path (T).

12. The device as claimed in claim 11, comprising means (7) for determining the optimal positions (P1B, P2C, PN-6D, PN-4C, PN-1B) of the points of change of flight level between said first and second positions (PO, PF).

* * * * *